INVENTOR
Gustave Walter

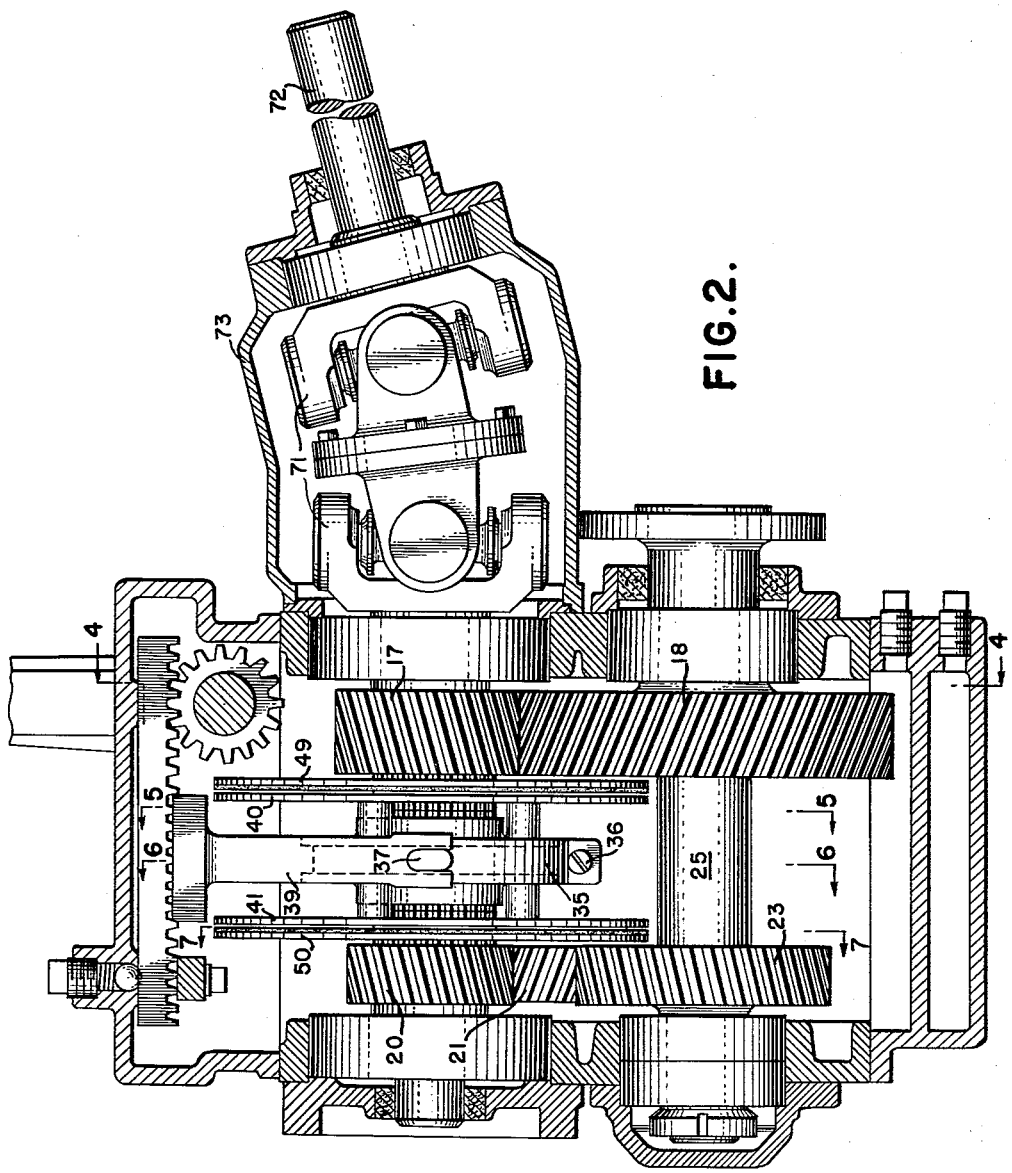

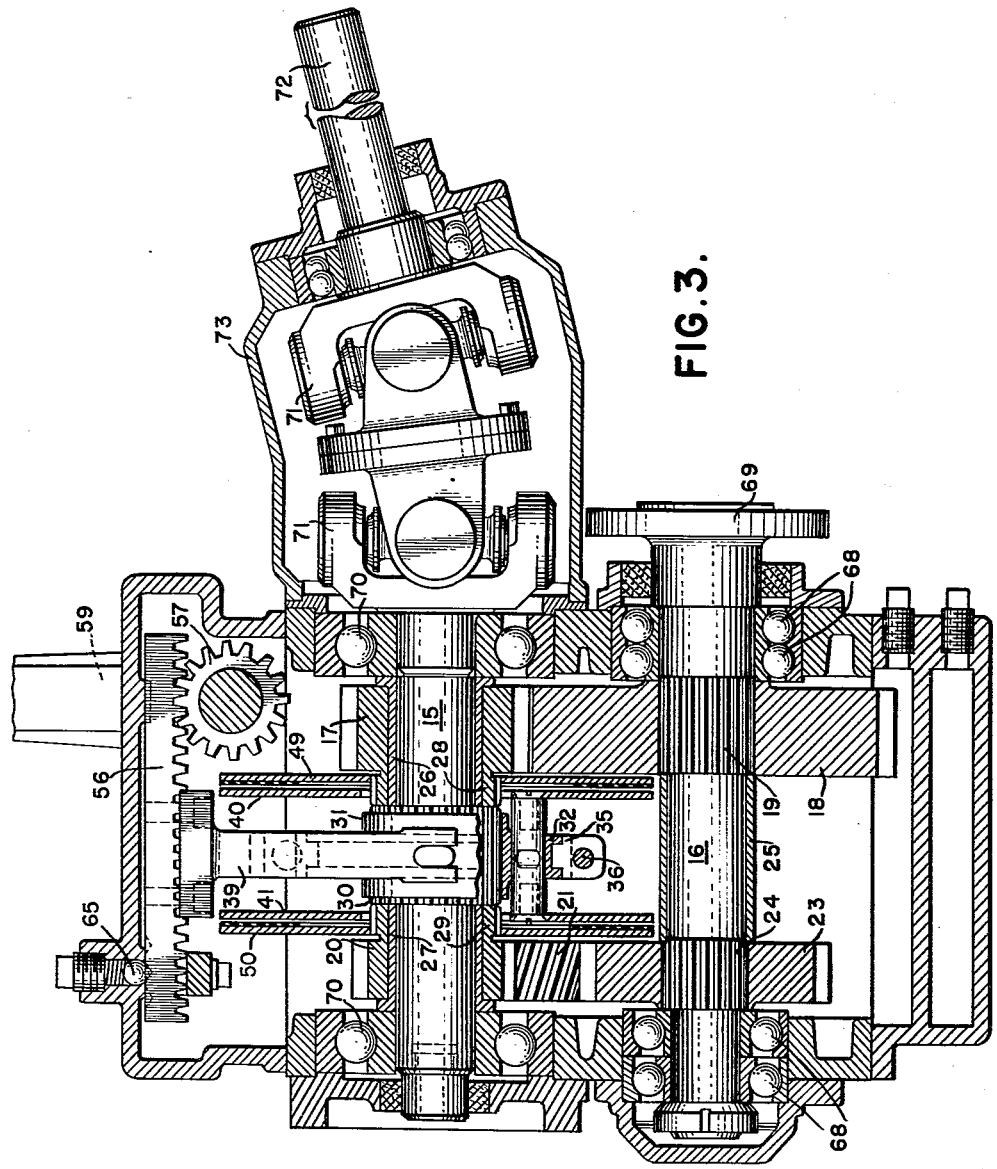

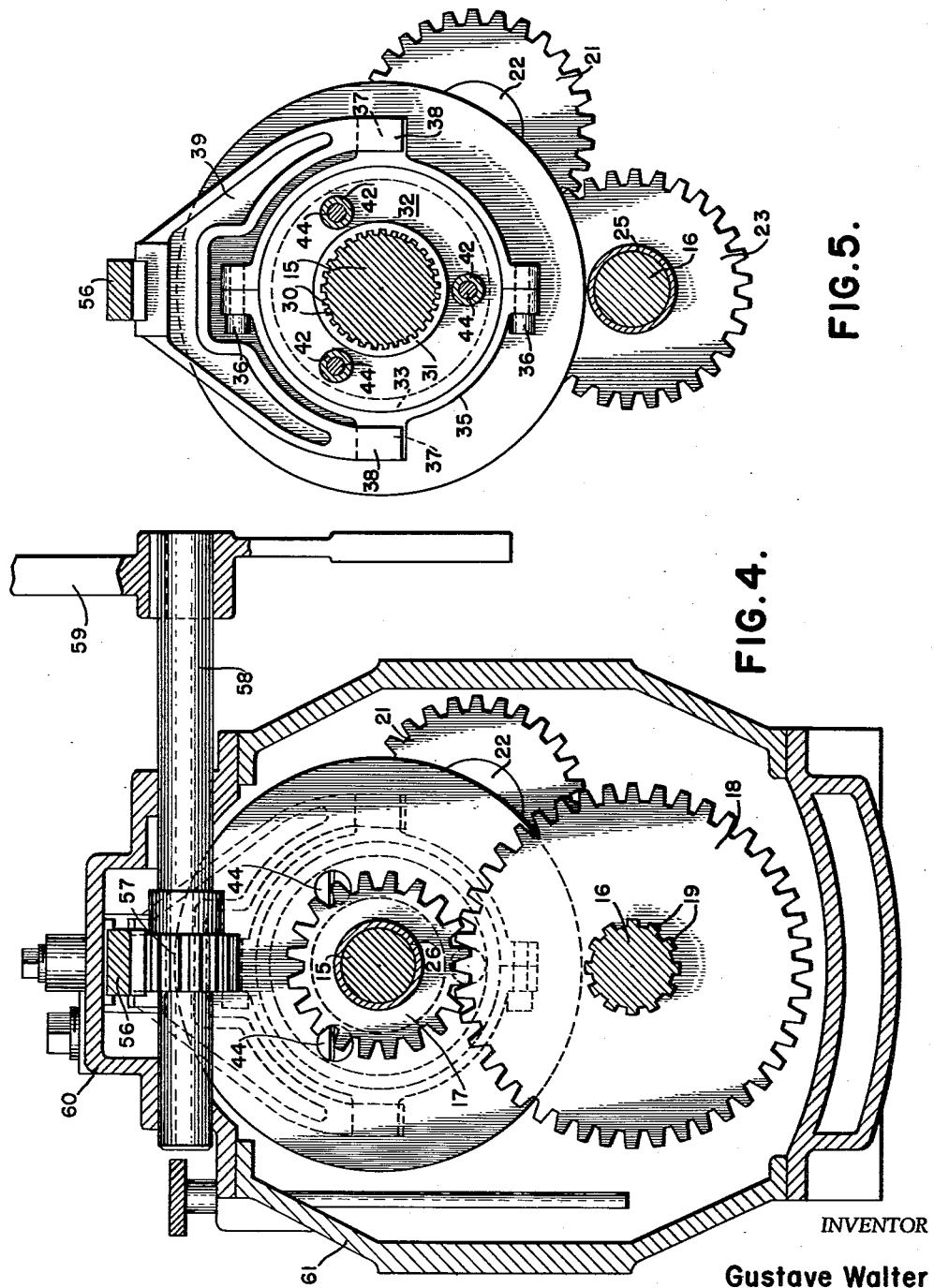

Sept. 12, 1961  G. WALTER  2,999,397
DRIVE GEAR AND CLUTCH ASSEMBLY
Filed Jan. 30, 1959  6 Sheets-Sheet 5

INVENTOR

Gustave Walter

BY Mawhinney & Mawhinney
ATTORNEYS

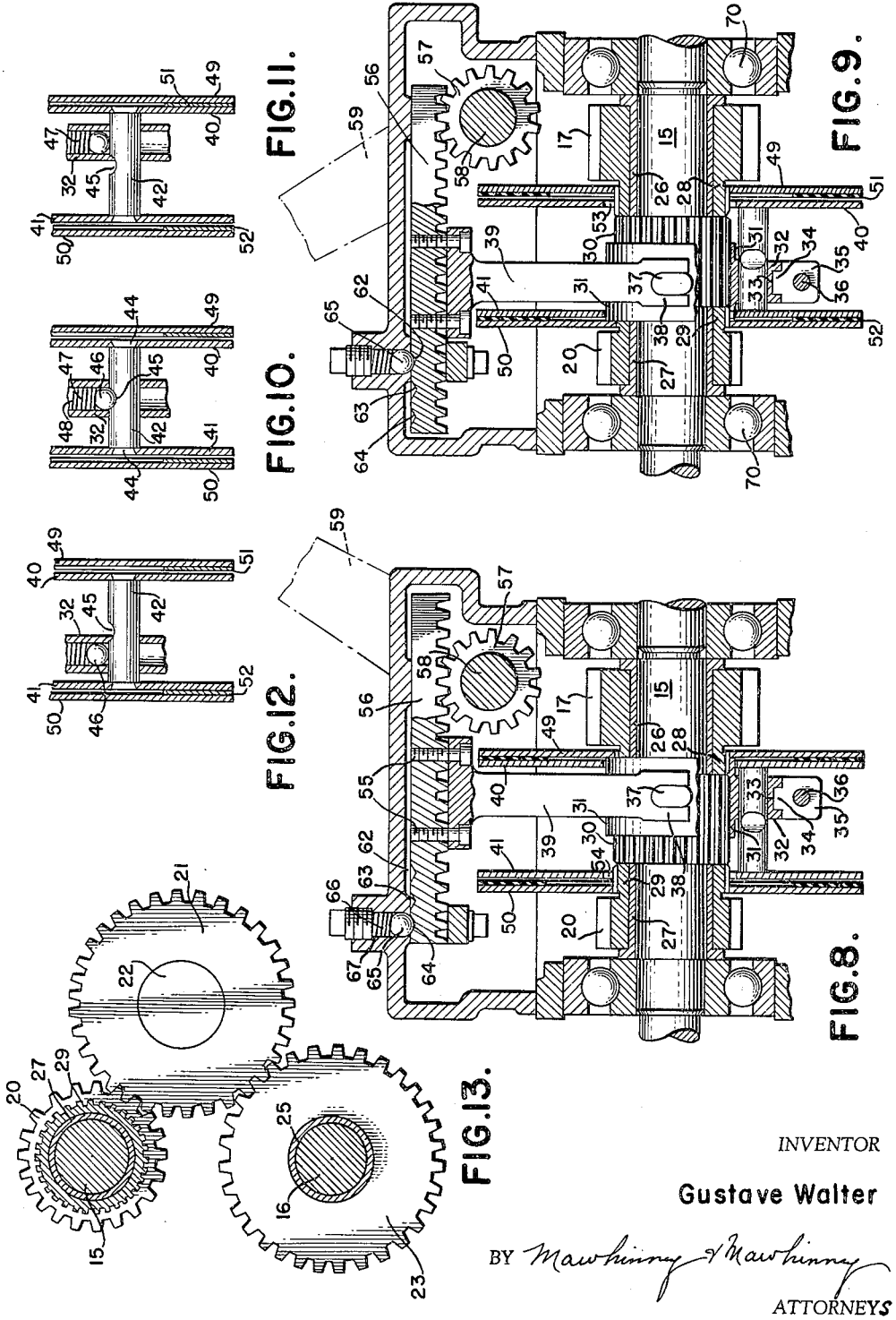

United States Patent Office 2,999,397
Patented Sept. 12, 1961

2,999,397
DRIVE GEAR AND CLUTCH ASSEMBLY
Gustave Walter, 15 Thorne St., Jersey City, N.J.
Filed Jan. 30, 1959, Ser. No. 790,189
5 Claims. (Cl. 74—377)

The present invention relates to drive gear and clutch assembly, and inasmuch as the application of the invention to marine use is of chief concern to the applicant, the drawings illustrate a single form of the invention as a marine reverse and reduction V-drive gear, although it will be understood that such invention is applicable to industrial uses.

It is an object of the invention to provide a workable compact transmission which incorporates forward, neutral and reverse drives, with also a gear reduction where required: and with this transmission it is not necessary to use a conventional marine engine which is generally equipped with a marine reverse gear; the functions of this marine reverse gear, such as forward, neutral and reversing clutch operations being included in the transmission of this invention.

Accordingly, the propulsion engine can, therefore, be a gasoline or diesel engine of suitable horsepower for this transmission and independently or directly connected to the same. This new marine transmission, however, controls all the movements of the boat, namely, the forward and reverse speed and the neutral position of the clutch assembly. It also incorporates a gear ratio, reduction or speed-up most suitable for the proper performance of the boat.

The invention has for its further purpose to provide a novel form of clutch assembly of comparatively short throw and including both pilot and main clutches so relatively arranged as to be sequentially applied whereby the drive gear, normally idling, may by the use of the pilot clutches be brought up to a synchronized speed with the drive shaft to facilitate the engagement of the main clutch elements.

The invention also has for a further object to provide a novel form of clutch assembly including both main and pilot complementary clutches with a form of release between the shifter member and the pilot drive clutch members so that after the drive gear is brought up to synchronized speed with the drive shaft after initial engagement of the pilot clutch members, such pilot clutches may be released from the shifter member to permit the shifter member to continue to perform the final engagement of the main clutch elements.

With the foregoing and other objects in view, the invention will be more fully described hereinafter, and will be more particularly pointed out in the claims appended hereto.

In the drawings, wherein like symbols refer to like or corresponding parts throughout the several views.

FIGURE 2 is a longitudinal section taken through the gear housing and showing the drive gear and clutch assembly in elevation.

FIGURE 3 is a longitudinal sectional view taken through the gear housing and also through the drive gear and clutch assembly.

FIGURE 4 is a transverse sectional view taken on the line 4—4 in FIGURE 2.

FIGURE 5 is a similar view taken on the line 5—5 in FIGURE 2.

FIGURE 8 is a fragmentary longitudinal sectional view, similar to FIGURE 3, showing the clutch in forward drive and with the rack bar partly broken away.

FIGURE 9 is a similar view showing the clutch in reverse gear.

FIGURE 10 is a sectional view of a detail showing the opposed forward and reverse pairs of pilot clutch members with the release or yieldable connection in the neutral position.

FIGURE 11 is a similar view showing the release effected in the forward drive position.

FIGURE 12 is a similar view showing the release effected in the reverse drive position.

FIGURE 13 shows in side elevation the reverse gear train with the drive and follower shafts and a portion of the reverse gear in section.

FIGURE 14 is a sectional view of a form of mounting for the reverse idler gear.

*Gear assembly*

Figure 1:
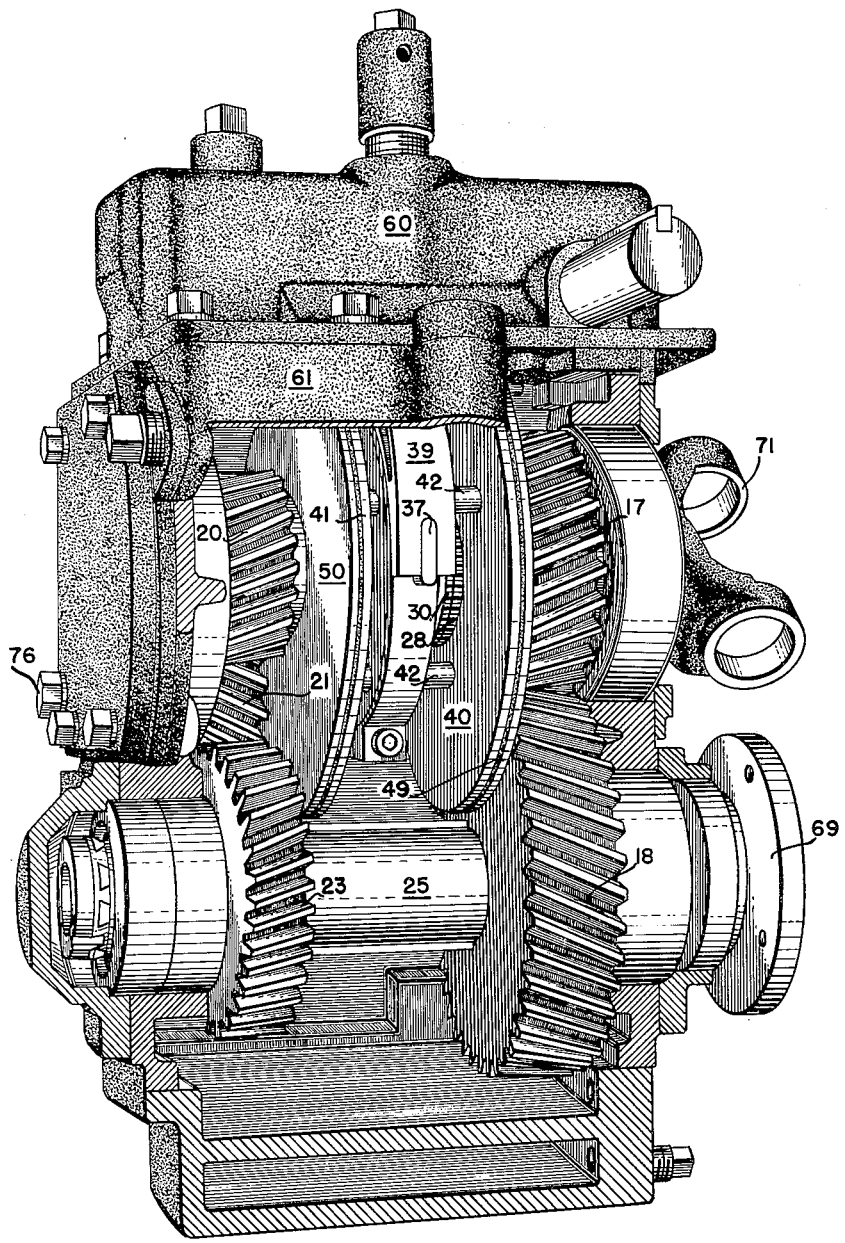
FIGURE 1 is an isometric view of a drive gear and clutch assembly according to the present invention with the gear case partly broken away and partly shown in section.

Referring more particularly to the drawings, 15 designates a drive shaft, driven by any suitable means, and 16 a driven or follower shaft adapted to be connected to the propeller of a boat or other device.

Loosely mounted on the drive shaft 15 is a forward drive gear 17 disposed in constant mesh with a forward driven gear 18 fast on the driven shaft 16 as by use of the splines 19 (FIGURE 3). In spaced relation on the drive shaft 15, is a reverse drive gear 20 loosely mounted thereon and in constant mesh with an idler reverse gear 21 on an idler gear shaft 22 (FIGURE 13), the idler 21 being in constant mesh with a driven reverse gear 23 fast on the driven shaft 16 as by the use of splines 24 (FIGURE 3). A spacer sleeve 25 is fitted over the driven shaft 16 between the driven gears 18 and 23. The forward and reverse drive gears 17 and 20 may be mounted respectively upon bushings 26 and 27, it being understood that the drive shaft 15 does not directly drive either of these gears 17, 20 but that the same are only driven through the clutch mechanism.

*Clutch assembly*

On its inner end the forward drive gear 17 is provided with a stepped-down section or sleeve having external splines or teeth and similarly the reverse drive gear is provided with a stepped-down section or sleeve 29 also with external splines or teeth. The external splines on sections 28 and 29 are in axial alinement with the external splines on a diametrically enlarged central section 30 of the drive shaft 15, which enlarged section abuts the stepped-down sections 28 and 29, whereby the internal mating splines of a shifter clutch sleeve 31 which is in mesh with the splines 30 of the drive shaft 15 and slides axially therealong may selectively engage sections 28 or 29 when the shifter clutch sleeve 31 is moved to one or the other position as indicated in FIGURES 8 and 9.

A shifter clutch disc 32 carried with the sleeve 31 has an external groove 33 (FIGURES 8 and 9) square in cross-section which is adapted to receive a square internal bead 34 on a clutch ring 35 (FIGURE 5) made in half sections and bolted or otherwise secured together by the bolts 36. At diametrically opposite points on the clutch ring 35 project pins or trunnions 37 engaged by claws 38 of a shifter yoke 39. The shifter yoke 39 may be operated back and forth by any suitable device.

Figure 7:
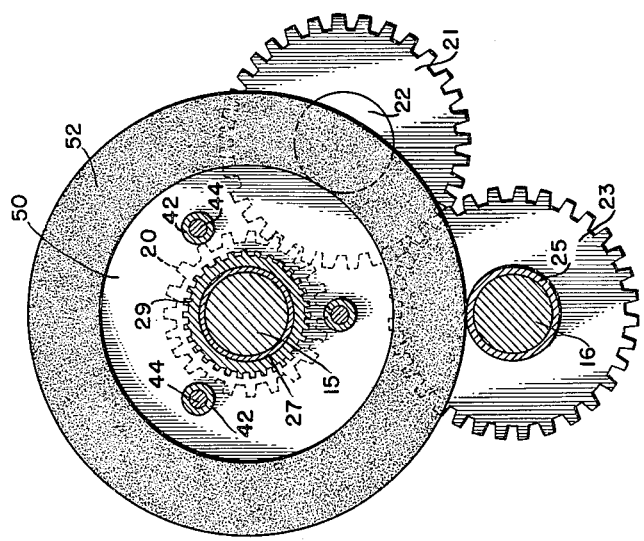
FIGURE 7 is a similar view taken on the line 7—7 in FIGURE 2.
Figure 6:
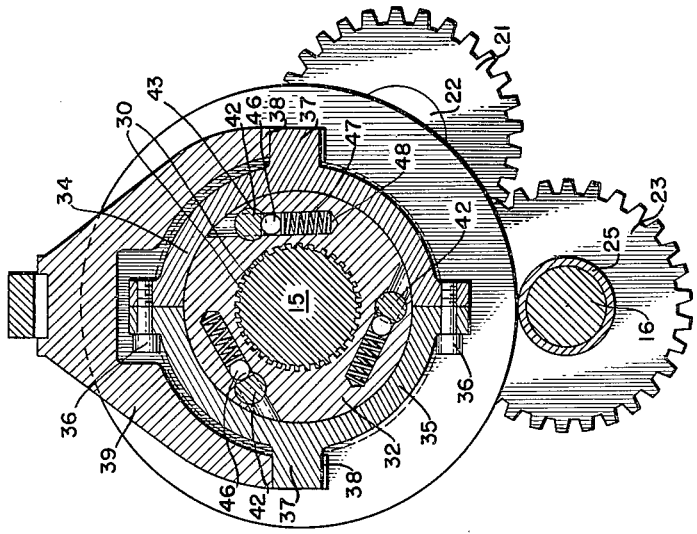
FIGURE 6 is also a transverse sectional view taken on the line 6—6 in FIGURE 2.

Clutch plates 40 and 41 are affixed in spaced relation by pins 42 which may be three in number (FIGURES 5, 6 and 7), the clutch members 40, 41 being secured to the pins by screws 44 (FIGURES 4 and 7) in such manner that the pins 42 are non-rotatable. The pins are slidably fitted through holes 43 in the clutch disc 32 and at intermediate points are provided with sockets 45 presented to balls 46 urged yieldably thereinto by coil or other springs 47 mounted in recesses 48 in the disc 32. As seen in FIGURE 6, the pins and ball detents or release devices are three in number being placed at 120° apart around the circle of the clutch disc 32. The clutch plates 40, 41 are thus entrained to rotate with the shifter device and the shifter device is movable axially along the pins relatively to the plates 40, 41 which thus constitute pilot drive clutch members.

Pilot driven clutch members or plates 49, 50 are opposed respectively to the pilot drive clutch members 40, 41, the driven members 49, 50 being preferably provided with friction clutch facings 51 and 52. The driven clutch members 49, 50 are affixed respectively to the forward and reverse gears 17, 20 as by providing splined openings in the members 49, 50 which interfit with the splines of the stepped-down sections or sleeves 28, 29 of the gears 17, 20.

Clutch drive

As seen more particularly in FIGURES 4, 8 and 9, 55 designates screws or other fastenings for attaching the clutch yoke 39 to a rack bar 56 which is disposed in mesh with a pinion 57 on a shaft 58 to which is attached a handle or lever 59 (FIGURE 4). The shaft 58 is journaled in bearings in the top cover 60 of a gear case or housing 61. In the rack bar are provided notches 62, 63 and 64 occupied selectively in three positions of the rack bar by a ball 65 urged thereto by a coil spring 66 mounted in a recess 67 of the top cover 60. The spring pressed ball 65 constitutes a form of detent for yieldably maintaining the shifter member in a neutral position or in a forward or reverse drive position.

Gear drive

As shown more particularly in FIGURE 3, ball bearings 68 are provided in the casing or housing 61 for the driven shaft 16 and on the output end of this shaft may be arranged a coupler flange 69 by which a propeller shaft or the like may be affixed.

The drive shaft 15 is also preferably journaled in ball bearings 70 and at one end this drive shaft 15 connects with a double universal joint 71 driven from the driving motor or engine through a connecting shaft 72 which enters an angle housing 73 containing the double universal joint. This housing 73 and the housing 61 contains lubricant and are tightly sealed. The driven arrangement is more particularly disclosed and claimed in my prior Patent 2,859,634, granted November 11, 1958.

Referring more particularly to FIGURE 14, 74 designates ball bearings for the idler gear shaft 22, the idler gear being designated 21. Lock rings 75 secure the ball bearings 74 and the idler gear 21 in place. The shaft 22 is held to the housing wall 61 by a retaining screw 76.

Operation

The drive shaft 15 will be continuously driven through the universal 71 and connecting shaft 72 from the engine or other source of power, or this drive shaft 15 may be driven in any suitable manner. When the clutch is in neutral the forward and reverse drive gears 17, 20 will idle and will not be driven. The neutral position of the clutch is shown in FIGURES 2, 3 and 10 in which the balls 46 of the shifter member will occupy the sockets 45 in the pins 42 and accordingly the clutch plates 40, 41 which are the pilot drive clutch members, while driven continuously by the drive shaft will not contact their complementary clutch plates or members 49, 50 and therefore no drive will be communicated to either forward or reverse drive gears 17, 20.

In like manner the internally splined clutch sleeve 31 which is continuously driven from the drive shaft 15 through its diametrically enlarged splined central section 31 will not communicate any motion to the gears 17, 20 as this shifter sleeve 31 is shown to be somewhat narrower than the splined enlarged section 30 of the drive shaft 15. Therefore, in its central neutral position it will not engage either of the stepped-down externally splined sections 28, 29 of the gears 17, 20.

Now the clutch plates 40, 49 and 41, 50 constitute pilot clutch members for forward and reverse driving while the splined parts 31, 28 and 29 constitute main clutch elements also for forward and reverse drive.

From FIGURE 3 it will be noted that in the neutral position the handle 59 is vertically erect and the rack bar detent ball 65 occupies the intermediate notch 63.

In FIGURE 8 the handle 59 is shown as swung over to the right hand position with an attendant shifting to the right of the rack bar 56, the detent ball 65 having been forced out of the intermediate notch 63 and now occupies the left end notch 64.

By referring to FIGURE 9 it is shown that when the handle 59 is swung over to the left, through the pinion 57 the rack bar 56 has been shifted all the way over to the left so that the detent ball 65 now occupies the extreme right-hand notch 62.

From FIGURE 3, it will be seen that the friction clutch plates 40, 49 and 41, 50 are closer together in the neutral position than the elements of the main clutch involving the internal splines on opposite ends of the clutch sleeve 31 and the external splines on the stepped-down sections 28, 29 respectively of the forward drive pinion 17 and reverse drive pinion 20. Therefore, when the clutch yoke 39 is shifted in either direction the pilot clutch of that direction will engage before its corresponding main clutch.

If we assume that we are moving to the right toward the position of FIGURE 8 and from the position of FIGURE 10 to that of FIGURE 11, the initial thrust developed through the rack bar 56 to the yoke 39 and shifter sleeve 31 will cause rotating friction clutch plate 40 to contact lined idler clutch plate 49, it being understood that this movement of the shifter member is communicated to the pins 42 by reason of the fact that the ball latches 46 are occupying the central sockets 45.

As soon as the pilot plate clutches or members are thus engaged rotary movement will be communicated to the forward driving gear 17 and through this gear to the follower gear 18 and thus to the follower shaft 16, imparting rotation to the propeller or other device connected to this driven shaft. The forward driving gear 17 will thus pick up speed and rapidly approach or equal that of the drive shaft 15, bringing the stepped-down externally splined section 28 thereof into substantially synchronous speed with the external splined section 30 of the driving shaft 15. Meanwhile, the engagement of the pilot drive clutch plate 40 with its companion clutch plate 49 will arrest further movement to the right of the unit which comprises the pins 42 and the clutch plates 40, 41. However, axial thrust to the right is still being applied to the shifter including the sleeve 31 which is sliding over the splined section 30 of the drive shaft 15 in the direction of the stepped-down externally splined part 28 of the gear 17.

As these two members are now rotating at substantially the same speed, the splines may move into interfitting relation smoothly and without noise. To further facilitate these results, the meeting edges of these splines may be sharpened, tapered or otherwise reduced in cross-section or form so as to guide the splines into the spaces between splines of the corresponding member.

To permit of the continued axial thrust movement of the shifter sleeve 31 after the pilot plates 40, 49 engage, the springs 47 will yield due to inferior load with respect to the thrust pressure so that the balls 46 may move out of the sockets 45 as shown in FIGURE 11. As soon as this occurs of course the thrust pressure will be released from the pilot clutch plates 40, 49 so that the same will rapidly become ineffective. However, at this time both clutch plates 40, 49 will be driven around together as they are both connected to the drive shaft 15.

By swinging the handle 59 to the left as shown in FIGURES 9 and 12 a similar result will be secured with respect to the reverse drive gear 20. In other words, the pilot clutch plates 41, 50 will be first engaged causing the reverse drive gear 20 to be put into motion and gradually to attain the speed of the drive shaft 15 whereupon the shifter sleeve 31 will move over the stepped-down externally splined section 29 of the reverse drive gear 20 and thus establish a positive drive between the shaft 15 and the reverse drive gear 20.

While the load of the springs 47 is sufficient to establish a driving relation between the shifter member and the pins 42 the superior force of the pinion 57 and rack bar 56 acting on the shifter member will override this spring load and thus shift the balls 46 out of the pin sockets 45 as shown in FIGURE 12 thus enabling the shifter sleeve 31 to continue into a positive driving engagement with the splines of the stepped-down section 29 of the reverse drive gear 20.

When the device is in forward driving position as shown in FIGURE 8, the reverse gear train may be driven backwardly from the driven shaft as the same is entirely free of the drive shaft. When shifting in forward driving position has been completed, engine revolutions may then be increased until full horsepower of the engine is used. Also, when such shifting is completed the shifter rack has moved to full forward position and the ball 65 has snapped into the notch 64 of the shifter rack 56 thus positively maintaining the clutch in the forward driving engagement.

After being in forward driving gear and before shifting into neutral, engine r.p.m. are substantially reduced by moving the throttle and the handle 59 is thereupon grasped and moved from the position of FIGURE 8 back toward a vertical neutral position. In so doing the detent ball 65 is moved out of the notch 64 and the clutch sleeve 31 will be withdrawn from engagement with the spline section 28 of the forward driving gear 17. When so disengaged the three balls 46 will snap back into the sockets 45 of the shifter pins 42. At the same time the ball detent 65 will be caused by its spring 66 to snap into the neutral or intermediate notch 63 of the rack bar 56, thus keeping the clutch in accurate neutral position to prevent frictional engagement of either pair of pilot friction discs or plates to obtain a good non-dragging neutral.

It is always preferred that the clutching operation be not done under full power throttle of engine. It is always advisable to reduce to frictional horsepower output of engine and the clutching operation is then substantially a synchronizing operation with the pilot clutches acting to synchronize the splined members for direct engagement of internal to external splines when shifting, and also to rotate the propeller of the boat sufficiently to synchronize its speed with the lower engine revolutions.

In addition to using this marine transmission in the operation of the boat, it can also be used for generating electricity because of its non-dragging neutral. Most smaller boats do not have adequate facilities to produce sufficient electrical current, supplying enough energy for the various utilities, such as electric refrigerator, electric stove, electric heating, radio, television and other appliances, which are modern appliances upon water craft.

A separate motor is usually required to generate this current but there is insufficient room in these smaller boats for the auxiliary power plant. With the transmission of this invention, however, a substantial additional generator can be driven by the drive shaft 15, this being accomplished by using an adapter attached to the left end of the drive shaft as appears in FIGURE 3. When the boat is at rest with the transmission in neutral position, the engine can be operated to rotate the electric producing generator to supply necessary current to the various electric utilities.

This transmission is also very suitable for industrial applications to drive components which have to be operated in forward and reverse rotation. It can also be used as a two speed transmission, namely, instead of the reverse gear the idler 21 may be removed and the gear 20 directly connected with the follower gear 23 on the driven shaft 16, the gear ratio being different from that of the gears 17, 18. The device obviously also could be operated as a clutch for a single speed transmission.

The ball 46 and socket 45 arrangement for each pin 42 constitutes a yieldable connection between the shifter clutch member 32 and the pair of pilot drive clutch members 40, 41. There is associated with this yieldable connection a lost motion device resulting from the freedom of relative axial movement of the part 32 on the one hand and the assembly 40, 41 and 42 on the other hand. This lost motion device is made possible by the fact that there is only one socket 45 involved and that this socket is spaced in both axial directions from the clutch members 40, 41. Once the ball 46 is forced out of the socket 45 from its position of FIGURE 10 to either that of FIGURE 11 or FIGURE 12, the entrainment of the assembly 40, 41 and 42 is lost whereby two results are achieved, namely, the previously engaged clutch member 40 or 41 is enabled to back off from its companion driven clutch member 49 or 50, releasing the previously engaged pilot clutch as by an axial movement of the pins 42 through the clutch shifter member or disc 32 in an opposite axial direction to that in which just previously driven under the entrainment when the balls 46 occupy the sockets 45 as shown in FIGURE 10.

The other result is that the balls 46 are unimpeded in their relative movement along the smooth unsocketed remaining portions of the pins 42 to enable, without any effect on the freed pilot assembly 40, 41 and 42, the shifter member 32 to continue uninterruptedly along its axial movement until the shifter clutch sleeve 31 engages one or other stepped down section 28, 29 of the forward or reverse drive gears 17, 20.

Although I have disclosed herein the best form of the invention known to me at this time, I reserve the right to all such modifications and changes as may come within the scope of the following claims.

What is claimed is:

1. In combination, a drive shaft, a drive gear, and a clutch assembly for coupling said gear to said shaft comprising shifter means on, driven by and immovable rotatably independently of said shaft, complementary drive and driven main clutch elements connected respectively to said shifter means and gear, complementary drive and driven pilot clutch members also connected respectively to said shifter means and gear in such relation as to precede engagement-wise the engagement of the main clutch elements, a yieldable connection between the shifter means and drive pilot clutch member automatically disconnectable on continued applied thrust to the shifter means after engagement of the pilot clutch members to permit the continued movement of the drive main clutch element into engagement with its complementary driven main clutch element, a lost motion device associated with said yieldable connection for permitting of relative freedom of movement between said drive pilot clutch member and the shifter means after the yieldable connection has been disconnected so that, while the drive main clutch element continues movement in the same direction under said continued applied thrust to the shifter means, the drive pilot clutch member may back off in the opposite direction freeing the pilot clutch, means independent of the yieldable connection and lost motion device for latching the shifter means in position in which the main clutch elements are engaged, and means for continuing to rotate in synchronism the drive and driven pilot clutch members after the yieldable connection and lost motion device have freed the same from engagement.

2. In combination, a drive shaft having a fixed raised gear, forward and reverse drive gears loose on said shaft separated by said raised gear and abutted at opposite ends thereagainst and having toothed sections adjoining the raised gear with complementary aligned teeth, a shifter clutch sleeve having internal splines in driven mesh with the raised gear and against rotation relatively to said sleeve axially slidable thereon and into and out of mesh with said aligned teeth of said sections of the drive and reverse gears, driven clutch plates having teeth interfitted with the teeth of said sections, drive clutch plates mating with said driven clutch plates, pins connecting said drive clutch plates in a unitary assembly, a shifter clutch member coupled to be rotated with said sleeve and through which said pins are fitted for axially sliding movement, each of said pins having a single socket intermediate its ends, spring pressed balls on said shifter clutch member adapted in neutral poition to occupy said sockets to constitute yieldable connections between the shifter clutch member and said assembly to move the assembly axially in either direction to engage the drive clutch plates with the driven clutch plates, said pins having between the sockets and said drive clutch plates substantially uninterrupted smooth portions for receiving said balls to form a lost motion device permitting of free axial movement of the assembly in either direction to disengage the plates and a free axial movement of the shifter clutch member and its sleeve without entrainment of the assembly into clutch engaging relation with said teeth of said sections.

3. In combination, a drive shaft having a fixed raised gear, forward and reverse drive gears loose on said shaft separated by said raised gear and abutted at opposite ends thereagainst and having toothed sections adjoining the raised gear with complementary aligned teeth, a shifter clutch sleeve having internal splines in driven mesh with the raised gear axially slidable thereon and into and out of mesh with said aligned teeth of said sections of the drive and reverse gears, driven clutch plates having teeth interfitted with the teeth of said sections, drive clutch plates mating with said driven clutch plates, pins connecting said drive clutch plates in a unitary assembly, a shifter clutch member coupled to be rotated with said sleeve and against rotation relatively to said sleeve and through which said pins are fitted for axially sliding movement, each of said pins having a single socket intermediate its ends, spring pressed balls on said shifter clutch member adapted in neutral position to occupy said sockets to constitute yieldable connections between the shifter clutch member and said assembly to move the assembly axially in either direction to engage the drive clutch plates with the driven clutch plates, and lost motion devices associated with said yieldable connections for enabling the drive clutch plates to back off in an opposite direction from the driven clutch plates while the shifter clutch member and its sleeve are free for contained movement to enable the latter to engage the teeth of said sections.

4. In combination, a drive shaft having a fixed gear, forward and reverse drive gears loose on said shaft separated by said fixed gear and abutted at opposite ends thereagainst and having toothed sections adjoining the fixed gear with complementary aligned teeth, a shifter clutch sleeve having internal splines in driven mesh with the fixed gear axially slidable thereon and into and out of mesh with said aligned teeth of said sections of the drive and reverse gears, driven clutch plates fixed to said forward and reverse drive gears, drive clutch plates mating with said driven clutch plates, pins connecting said drive clutch plates in a unitary assembly, a shifter clutch member coupled to be rotated with said sleeve and against rotation relatively to said sleeve and through which said pins are fitted for axially sliding movement, each of said pins having a single socket intermediate its ends, a spring pressed ball on said shifter clutch member adapted in neutral position to occupy said socket to constitute a yieldable connection between the shifter clutch member and said assembly to move the assembly axially in either direction to engage the drive clutch plates with the driven clutch plates, and a lost motion device associated with said yieldable connection to permit of free floating movement of the assembly back and forth axially relatively to the shifter clutch member and its sleeve when the yieldable connection is disconnected and to permit the sleeve independently of the assembly to continue to move into clutch engagement with the teeth of said sections.

5. In combination, a drive shaft having a fixed gear, forward and reverse drive gears loose on said shaft at opposite sides of said fixed gear and having toothed sections adjoining the fixed gear with complementary teeth, a shifter clutch sleeve having splines in driven mesh with the fixed gear axially slidable thereon and into and out of mesh with the teeth of said sections of the drive and reverse gears, driven clutch plates fixed to said forward and reverse drive gears, drive clutch plates mating with said driven clutch plates, connecting members connecting said drive clutch plates in a unitary assembly, a shifter clutch member coupled to be rotated with said sleeve and against rotation rleatively to said sleeve and through which said connecting members are fitted for axially sliding movement, each of said connecting members having a socket intermediate its ends, yieldable pressed balls on said shifter clutch member adapted to occupy said sockets to constitute yieldable connections between the shifter clutch member and said assembly to move the assembly axially in either direction to engage the drive clutch plates with the driven clutch plates, and lost motion devices associated with said yieldable connections to permit of free floating movement of the assembly back and forth axially relatively to the shifter clutch member and its sleeve when the yieldable connections are disconnected and to permit the sleeve independently of the assembly to continue to move into clutch engagement with the teeth of said sections.

References Cited in the file of this patent

UNITED STATES PATENTS

| 2,014,486 | Vincent | Sept. 17, 1935 |
| 2,042,356 | Nardone | May 26, 1936 |
| 2,161,285 | De Kremer | June 6, 1939 |
| 2,546,746 | Henning | Mar. 27, 1951 |
| 2,547,732 | Baker | Apr. 3, 1951 |

FOREIGN PATENTS

| 740,557 | Germany | Oct. 23, 1943 |